(12) United States Patent  
Cavallari

(10) Patent No.: US 11,399,037 B2  
(45) Date of Patent: Jul. 26, 2022

(54) ANOMALY BEHAVIOR DETECTION IN INTERACTIVE NETWORKS

(71) Applicant: PayPal, Inc., San Jose, CA (US)

(72) Inventor: Sandro Cavallari, Singapore (SG)

(73) Assignee: PAYPAL, INC., San Jose, CA (US)

( * ) Notice: Subject to any disclaimer, the term of this patent is extended or adjusted under 35 U.S.C. 154(b) by 502 days.

(21) Appl. No.: 16/563,807

(22) Filed: Sep. 6, 2019

(65) Prior Publication Data

US 2021/0075805 A1  Mar. 11, 2021

(51) Int. Cl.
*H04L 9/40* (2022.01)
*H04L 67/08* (2022.01)
*G06N 3/08* (2006.01)

(52) U.S. Cl.
CPC .......... *H04L 63/1425* (2013.01); *G06N 3/08* (2013.01); *H04L 67/08* (2013.01)

(58) Field of Classification Search
CPC ........ H04L 63/1425; H04L 67/08; G06N 3/08
See application file for complete search history.

(56) References Cited

U.S. PATENT DOCUMENTS

| | | | |
|---|---|---|---|
| 9,858,265 B1* | 1/2018 | Mohaideen P | G10L 15/16 |
| 9,960,973 B1* | 5/2018 | Faibish | G06F 3/0685 |
| 10,299,142 B2* | 5/2019 | Vanhatupa | H04W 16/18 |
| 10,628,571 B2* | 4/2020 | Kursun | G06F 21/32 |
| 10,956,566 B2* | 3/2021 | Shu | G06F 21/554 |
| 11,010,516 B2* | 5/2021 | Sikka | G06N 7/005 |
| 11,147,459 B2* | 10/2021 | Sobol | H04W 84/12 |
| 11,184,374 B2* | 11/2021 | Shu | G06F 21/554 |
| 2014/0279779 A1 | 9/2014 | Zou et al. | |
| 2016/0308884 A1 | 10/2016 | Kent et al. | |
| 2019/0258401 A1* | 8/2019 | Li | G06F 3/068 |
| 2020/0120109 A1* | 4/2020 | Shu | G06F 16/9024 |
| 2021/0279579 A1* | 9/2021 | Blondel | G06F 17/17 |

* cited by examiner

*Primary Examiner* — Viral S Lakhia
(74) *Attorney, Agent, or Firm* — Haynes and Boone, LLP

(57) ABSTRACT

A system and method for detecting anomaly behavior in interactive networks are described. An attributed bipartite graph related problem is generated. A graph convolutional memory network is developed based on the generated problem. A loss function is further developed based on the developed graph convolutional memory network. The developed graph convolutional memory network is trained to learn interaction patterns between different components. Anomalies are detected based on the trained developed graph convolutional memory network.

16 Claims, 9 Drawing Sheets

Edge embedding

Whole graph embedding

Node embedding

Sub-graph embedding

Input graph

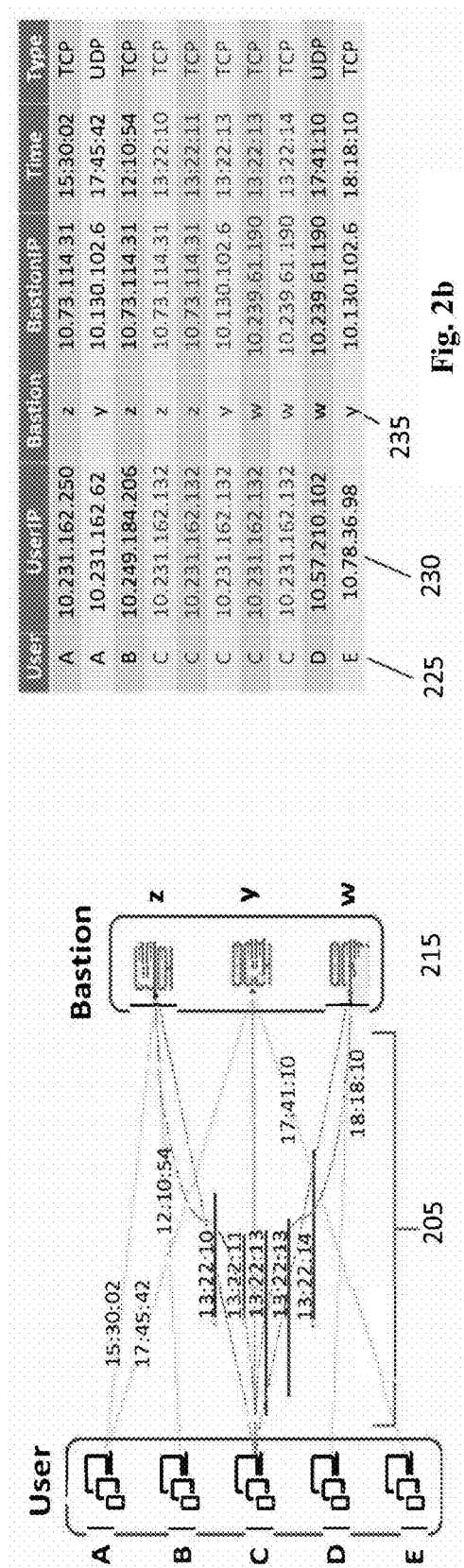
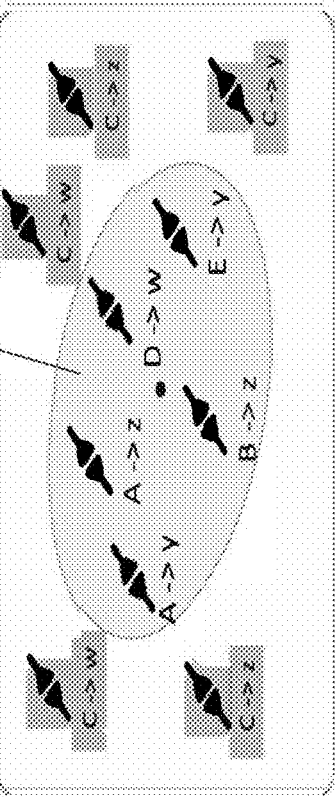
Fig. 2a
Fig. 2b
Fig. 2c

ANOMALY BEHAVIOR DETECTION IN INTERACTIVE NETWORKS

TECHNICAL FIELD

The subject technology generally relates to anomaly detection and more particularly, relates to a model for detecting anomalous behavior on an interactive graph.

BACKGROUND

Intrusion Detection Systems (IDS) have garnered much attention in recent years because of the critical impact these systems have had on sectors such as financial institutions, academia, energy industry and government. Anomaly detection, a specific research branch within IDS, is directed to identifying unexpected behaviors (e.g., behaviors that deviate from the common patterns). Anomaly detection further includes discovering the causes of unexpected events so that potential catastrophic consequences, such as data leaks, unauthorized transaction, or facilities breakdown may be prevented.

Complex systems are generally composed of several specialized components that synergistically interact with one another to achieve an objective. Accordingly, attribute networks and interaction networks have been of interest as a result of their ability to model real-world collaborative structure such as social networks, financial transactions, etc. These networks use edges to represent interactions that occur between different components of an entire system, while nodes are defined by additional information that is available for the different components. Each node may also have an associated attribute.

Graph analytics (i.e., the extraction of knowledge form graph structures) is known to be a challenging task. For example, tasks such as node classification, edge ranking or link prediction that require a set of features representative of the underlying structure cannot be fully captured by simple analytic values such as the node degree or the node centrality. Moreover, such feature sets are not easily generalizable from task to task and are thus generally expensive to compute on different graphs. Additionally, graph embedding, which is one of the more attractive techniques developed in recent years, proposes to automatically distill information produced by the graph into vectoral format.

Anomaly detection in multi-dimensional data is an important task to be solved from both the perspective of academia as well as industry. Recently proposed methods of anomaly detection demonstrate that preserving an interactive graph structure that's common in multiple applications in a vector space yields better performances. However, current methods for network based anomaly detection present limitations either in terms of scalability or in terms of representation learning. Accordingly, a more robust anomaly detection technique is required to address these issues.

SUMMARY

According to various aspects of the subject technology, a system for detecting anomalous behavior in interactive networks is described. An attributed bipartite graph related problem is generated. A graph convolutional memory network is developed based on the generated problem. A loss function is further developed based on the developed graph convolutional memory network. The developed graph convolutional memory network is trained to learn interaction patterns between different components. Anomalies are detected based on the trained developed graph convolutional memory network.

According to various aspects of the subject technology, a method for detecting anomalous behavior in interactive networks is described. An attributed bipartite graph related problem is generated. A graph convolutional memory network is developed based on the generated problem. A loss function is further developed based on the developed graph convolutional memory network. The developed graph convolutional memory network is trained to learn interaction patterns between different components. Anomalies are detected based on the trained developed graph convolutional memory network.

According to various aspects of the subject technology, a non-transitory machine-readable medium having stored thereon machine-readable instructions executable for detecting anomalous behavior in interactive networks is described. An attributed bipartite graph related problem is generated. A graph convolutional memory network is developed based on the generated problem. A loss function is further developed based on the developed graph convolutional memory network. The developed graph convolutional memory network is trained to learn interaction patterns between different components. Anomalies are detected based on the trained developed graph convolutional memory network.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 2a depicts a bipartite graph used to represent secure shell (SSH) connections occurring in a corporate network.

FIG. 2b depicts traditional IDSs process network traffic represented as plan relational tables.

FIG. 2c depicts the detection fraudulent connections by means of clustering in the embedding space.

DETAILED DESCRIPTION

Figure 1C:
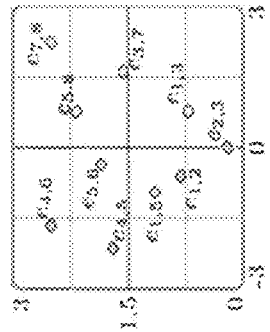
FIG. 1c provides an example of an edge embedding graph.

Recent research has shown that leveraging graph embedding techniques to preserve the interactive structure of a problem provide significant performance boost in traditionally challenging application such as recommendation systems, protein interaction, and image processing. By modeling the anomaly detection problem as an attributed interactive bipartite graph, a novel graph convolutional neural network that's able to automatically learn a meaningful problem representation that produce state-of-the-art results is proposed.

Traditionally, anomaly detection has been viewed as an unsupervised learning task, since supervised models are unable to detect unknown attacks. Supervised models, however, cannot fully leverage the massive amount of data generated because a massive amount of labelled dataset is required. For example, it's difficult for a human to determine what interactions are legitimate and what are attacks. In the context of the attributed network, anomaly detection has received recent attention since it is not yet well understood how two different sources of information, namely the graph structure and the attribute relative to a node/edge, are to be combined. Autoencoders have received substantial attention due to their ability to learn low-dimensional representations from high-dimensional inputs. Nevertheless, autoencoders struggle when processing sparse network structures.

Randomly generated paths have been contemplated to overcome this problem, but the embedding provided is neither specifically optimized for anomaly detection purposes, nor for preserving attributed edge information. Moreover, randomly generated paths have been shown to yield suboptimal results without completely preserving the graph structure. Factorization machines and non-negative matrix factorization have been extensively used to obtain a low-dimensional representation from non-relational datasets, but they allow only positive interactions and are subject to multiple degenerated solutions, and thus, are difficult to optimize. Similarly, singular value decomposition (SVD) and residual theory have been jointly used to detect anomalies on attributed networks. Such methodology, however, is known to be expensive to compute as the running time increases exponentially with respect to the number of nodes in a graph.

Other works have formulated the fraud impression detection in e-commerce as a Markovian Decision Process (MDP), and as a reinforcement learning problem. However, such a formulation lacks a well-defined value function of the actors involved. With interest focused on an edge representation rather than node ranking, the use of a single value instead of vectorial representation limits the expressive power of the model. Proposed models, for example, lack fine-gradient view of the problem. Even when the same concept is extended to dynamic graphs, the proposed methods lack a formal representation of the graph structure or require a substantial computational complexity.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

The present invention contemplates the formulation of the anomaly detection problem under the interactive graph framework. The development of a graph convolutional memory network enables the preservation of the interactions that happen among different nodes over time. From the graph convolutional memory network interaction patterns between different components can be learned. Furthermore, the advancement of a robust loss function makes it suitable for unsupervised learning.

Figure 1E:
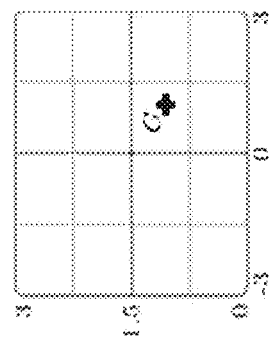
FIG. 1e provides an example of a whole graph embedding.
Figure 1B:
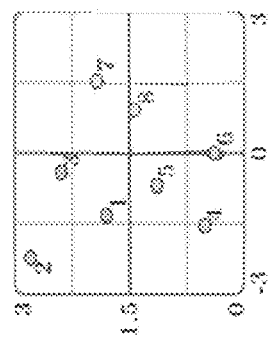
FIG. 1b provides a node embedding example in which the nodes of the input graph depicted in FIG. 1a are represented by a 2D vector.
Figure 1D:
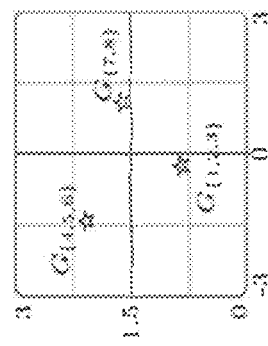
FIG. 1d provides an example of subgraph embedding.
Figure 1A:
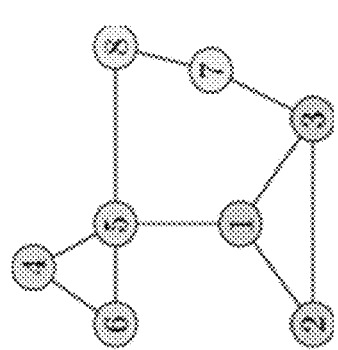
FIG. 1a provides an example input graph.

Executing complex analytical tasks over a variegated structure such as graphs is challenging for modern computers. However, to overcome such computational limitations, an alternative solution known as graph embedding has been proposed recently. According to the general embedding definition, graph embedding seeks a vectorial representation that is able to preserve as much as possible of the original information contained in the input graph. Eventually, the vectorial representation obtained is used to solve complex task such as anomaly detection. To better understand the graph embedding process, FIG. 1 provides an example where an input graph, FIG. 1*a*, is represented under different granularities as a set of 2D vectors. The most common case is to generate a vector for each node as shown in FIG. 1*b*, where "similar" nodes are associated to similar vectors. It is also possible to have edge embedding as shown in FIG. 1*c*, where similar edges are associated to similar vectors, subgraph embedding as shown in FIG. 1*d* or whole graph embedding as shown in FIG. 1*e*.

Intrusion Detection Systems (IDSs) monitor the network traffic to detect anomalous events and provide a certain level of security. FIG. 2*b* depicts traditional IDSs process network traffic represented as plan relational tables. In so doing, they lose the semantics contained in the interaction structure shown in FIG. 2*a*, which depicts a bipartite graph used to represent secure shell (SSH) connections 205 happening in a corporate network. That is, they mostly discharge the knowledge of who is communicating with whom. Note that the interaction between client 210 and server 215 is naturally encoded in the graph structure. Finally, FIG. 2*c* demonstrates how it is possible to detect fraudulent connections by means of clustering (e.g., cluster 220) in the embedding space. As described above, this is a graph convolutional neural network trained end-to-end in a fully unsupervised settings for anomaly detection.

Problem Formulation

Traditional anomaly detection models required a set of manually crafted features to detect some anomalies. Such an approach is generally expensive (i.e., time consuming and labor intensive) because it is difficult to manually define a comprehensive set of features that's capable of representing all the different real-world-patterns. Moreover, the manually crafted features are generally encoded by a sparse vector containing information not directly understandable by an algorithm, thus causing a dimensionality issue. Formulating the problem under a graph embedding framework, however, provides an ability to automatically learn a dense embedding that's representative of the underlying interactive structure that underpins problem. Such a data-driven approach avoids any human bias, and thus is capable of providing state-of-the-art results in multiple fields such as computer vision and natural language processing. Since it's difficult to know in advance all the possible types of abnormal behaviors (e.g., attacks) that can occur in a computer network, abnormal behaviors a fully unsupervised model is preferred While most of the previous graph embedding techniques focus on static graphs, the current system formulates the anomaly detection problem as an attributed interaction graph. Under such data structure, edges represent the interactions between two heterogeneous nodes. For example, as shown in FIG. 2b, in the context of detecting anomalous interne connections, an edge represents an attempt of connection between a user device 225, identified by its username or its IP address 230, and a hosting server 235. Thus, we model each example as a triple (source id, SSH information, bastion id), where the SSH information field represents connection specific attributes as the connection type or the time and duration of the link. The following definitions provide some context with respect to understanding the present invention:

Definitions

| Symbol | Description |
|---|---|
| G = (X, Y, E) | Input graph |
| X | Set of source nodes |
| Y | Set of destination nodes |
| E | Set of edges |
| $e_t = (x_t, a_t, y_t)$ | An edge at time t characterized by the source node $x_t$, the attributes $a_t$ and the target node $y_t$ |
| $\Upsilon : (E) \to \mathbb{R}^d$ | Edge embedding function. It associates a vector of size d to every input edge $e_t \in E$ such that similar edges have similar vectors. Note that $\Upsilon$ is composed of 3 different functions ($\psi$, $\varphi$ and $\varphi'$). |
| $\varphi : X \to \mathbb{R}^{d''}$ | Source node embedding function. In the context of anomaly traffic detection, it encodes the recent behavior of a source node $x_t$ into a vector of size d". According to Eq. 2 it is defined as a recursive nonlinear transformation of the current edge attribute $a_t$ and the previous source node embedding $\varphi_{t-1}(x_t)$. |
| $\varphi' : Y \to \mathbb{R}^{d'''}$ | Target node embedding function. It encodes the recent behavior of a target node $y_t$ into a vector of size d'''. According to Eq. 3 it is defined as a nonlinear recursive transformation of the current edge attribute $a_t$ and the previous node embedding $\varphi'_{t-1}(y_t)$. |
| $\Psi : E \to \mathbb{R}^{d'}$ | Edge attribute embedding function. It projects the attribute $a_t$ into a vector of size d'. According to Eq. 1 $\psi(a_t)$ is just a nonlinear transformation of the attribute $a_t$. |
| $z_t \in \mathbb{R}^d$ | Final edge embedding obtained from $\Upsilon$ as a nonlinear transformation of $\Psi$, $\varphi'$ and $\varphi$. |
| $c \in \mathbb{R}^d$ | Is the center of the sphere. It is used as an "anchor" since we force all $z_t$ (projected connections) to be as close as possible to the center c. That is, c represents the prototype of the common connections present in our dataset. In so doing rare anomalous connections are detected since do not conform well to this prototype. |
| $d_t \in \mathbb{R}^d$ | Distance between the center of the sphere c and the datapoint $z_t$. |

1. Attributed Interactive Graph: The attributed interactive graphs is a special form of a heterogeneous bipartite graph represented by G=(X, Y, E), where X and Y are two disjointed sets of nodes, and E represent the edge's set. Similar to a knowledge graph, each edge $e_t \in E$ can be represented by a triple $(x_t, a_t, y_t)$, where $x_t \in X$ and $y_t \in Y$ are the source and destination nodes, respectively, while $a_t = [a_{t,1}, \ldots, a_{t,n}]$ is the attribute vector of the interacting edge at time t. Note that the source nodes will be referred to as the nodes belonging to set X and the target nodes as the nodes belonging to set Y. The use of an attributed interactive graph provides for a low dimensional embedding of each edge, which has to be representative of both the edge and the incident nodes information. Furthermore, in unsupervised settings, prior information regarding which are the normal or abnormal behavior is not known. Abnormal behavior is figured out by the end of the process. In other words, everything is considered normal until determined to be anomalous.

2. Edge Embedding in Attributed Interaction Graph: Given an attributed interaction graph G=(X, Y, E), an edge embedding is a function $\Upsilon : (E) \to \mathbb{R}^d$. Since each edge is represented by a triple, $\Upsilon$ naturally assumes a representation composed of the current edge attribute, the source node behavior, and the target node behavior. On the one hand, having a compact characterization of the current interaction enables a model to discriminate between standard and abnormal behavior. Thus, $\psi(a_t) \in \mathbb{R}^{d'}$ is denoted as the dense embedding of the attribute of an edge $e_t$. On the other hand, being able to characterize the nodes' behavior in a vectoral format can enhance the ability to identify fraudulent activity. Thus, source and target node embedding may be denoted as $\varphi : X \to \mathbb{R}^{d''}$ and $\varphi' : Y \to \mathbb{R}^{d'''}$, respectively, to capture such behavioral schemes. For notational simplicity, $\varphi(x_t)$ and $\varphi'(y_t)$ will be denoted as the embedding of the source and target nodes of edge $e_t$.

Proposed Model

Figure 3:
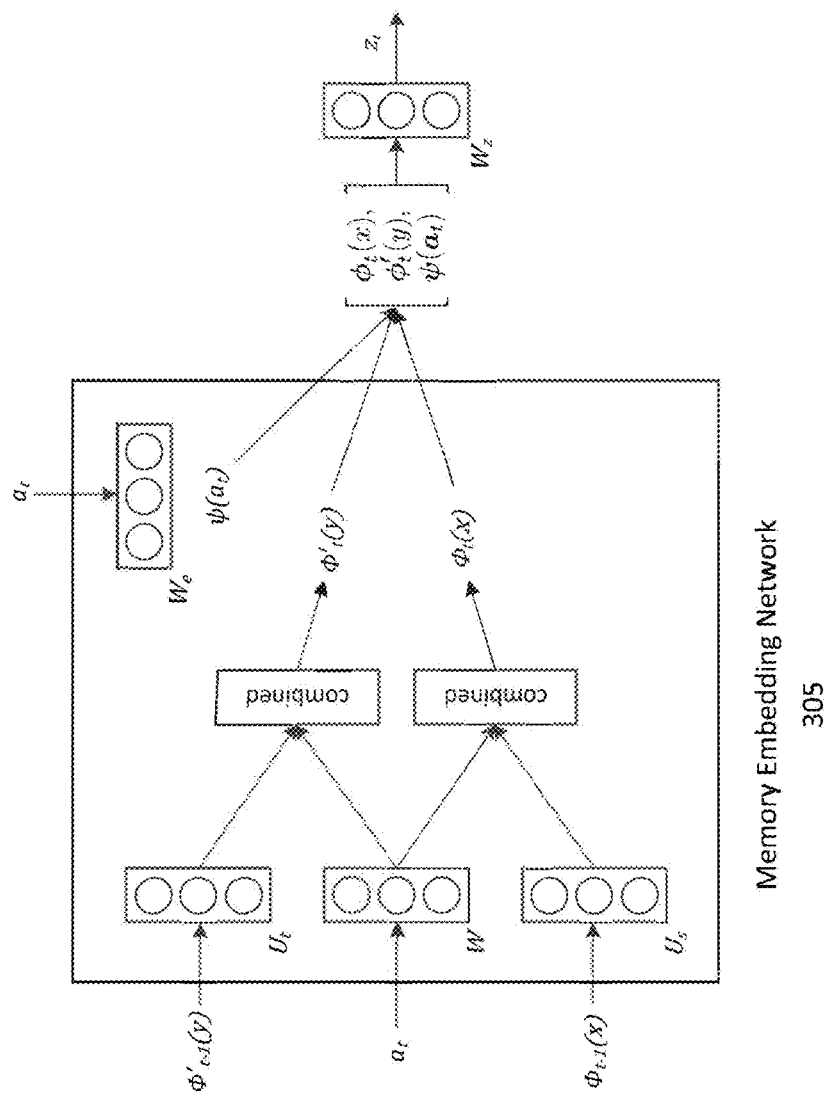
FIG. 3 depicts the proposed model divided into a first of two main components.
Figure 5:
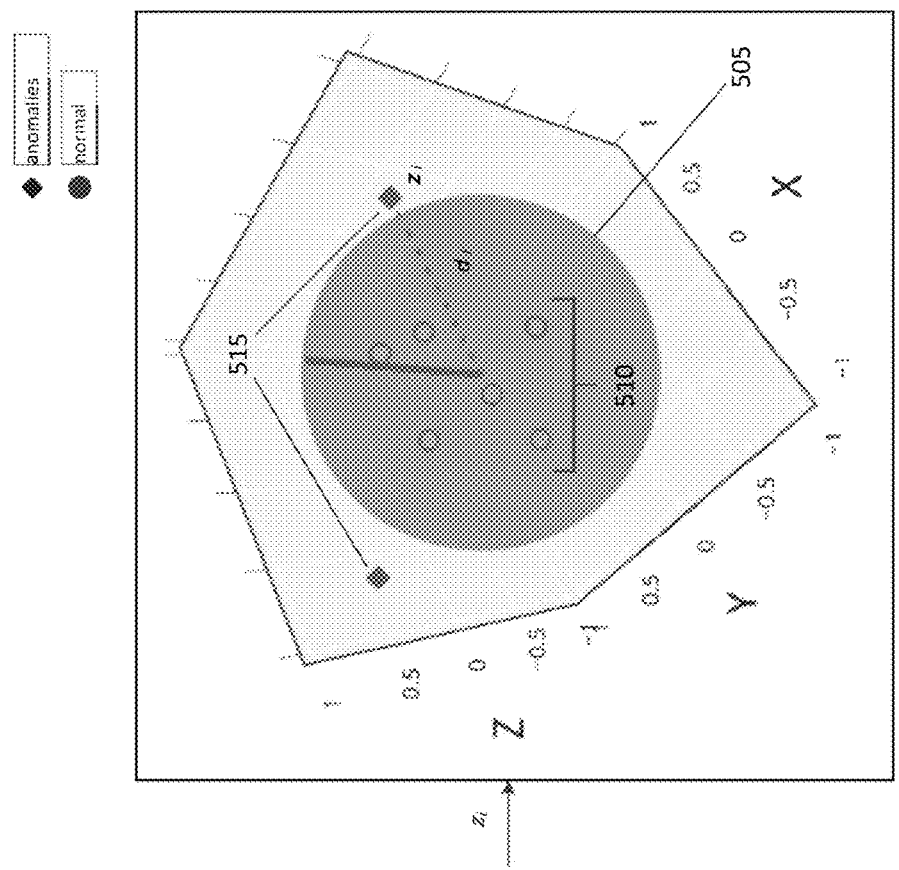
FIG. 5 provides an illustration of a closed boundary around the training data as a hypersphere

Traditionally, graph embedding is associated with unsupervised learning methods that are used to preserve a well-defined graph structure. However, to solve the anomaly detection problem, an embedding network that provides the capability of natively preserving the interactive structure of the problem while being finely tunable is preferred. As shown in FIG. 3, the proposed model is divided into two main components: 1) the memory embedding network 305 that automatically learns $\psi$, $\varphi$ and $\varphi'$, and 2) the hypersphere clustering (shown in FIG. 5) for determining the partition between normal and anomalous interactions. Accordingly, the embedding network may generate a meaningful embedding representative of the actor's behavior, while the hypersphere clustering may detect anomalous behavior based on the distance from the sphere's centroid in the embedded space.

Memory Embedding Network

Graph convolutional neural networks (GCN) have demonstrated state-of-the-art performances by being scalable to real-world dataset. However, to correctly solve the anomaly detection problem, a meaningful representation of each edge must be determined. Furthermore, transactions recently performed by the source and target nodes must be tracked. To address such issue, a novel convolutional memory embedding network, as shown in FIG. 3, may be used.

Given at time t, a new edge $e_t \in E$ is detected. The attribute embedding is first defined as:

$$\psi(a_t) = f(W_e a_t) \quad (1)$$

In this instance, f( ) is an activation function, and $W_e$ is a weighting matrix automatically learned by the system.

Subsequently, a node embedding representation of the previous interactions may be determined by a node. The rationale behind this is that the current node behavior depends on its previous actions as well as the current interaction. Thus, the node embedding process can be defined as:

$$\varphi_t(x_t) = f(W a_t + U_S \varphi_{t-1}(x_t)) \quad (2)$$

$$\varphi'_t(y_t) = f(W a_t + U_T \varphi'_{t-1}(y_t)) \quad (3)$$

Once again, f( ) is an activation function, and W, $U_S$ and $U_T$ are weight matrices used to transform the respective edge attribute $a_t$ and the previous memory representation.

Lastly, a comprehensive representation of each interaction may be obtained as:

$$z_t = \tanh(W_Z[\varphi_t(x_t), \varphi'_t(y_t), \psi(a_t)]) \quad (4)$$

where [., .] stands for the concatenation operation, and $W_z$ is a linear transformation. Note that $z_t$ contains information regarding the current interaction as well as a memory factor for the source and target node.

Figure 4:
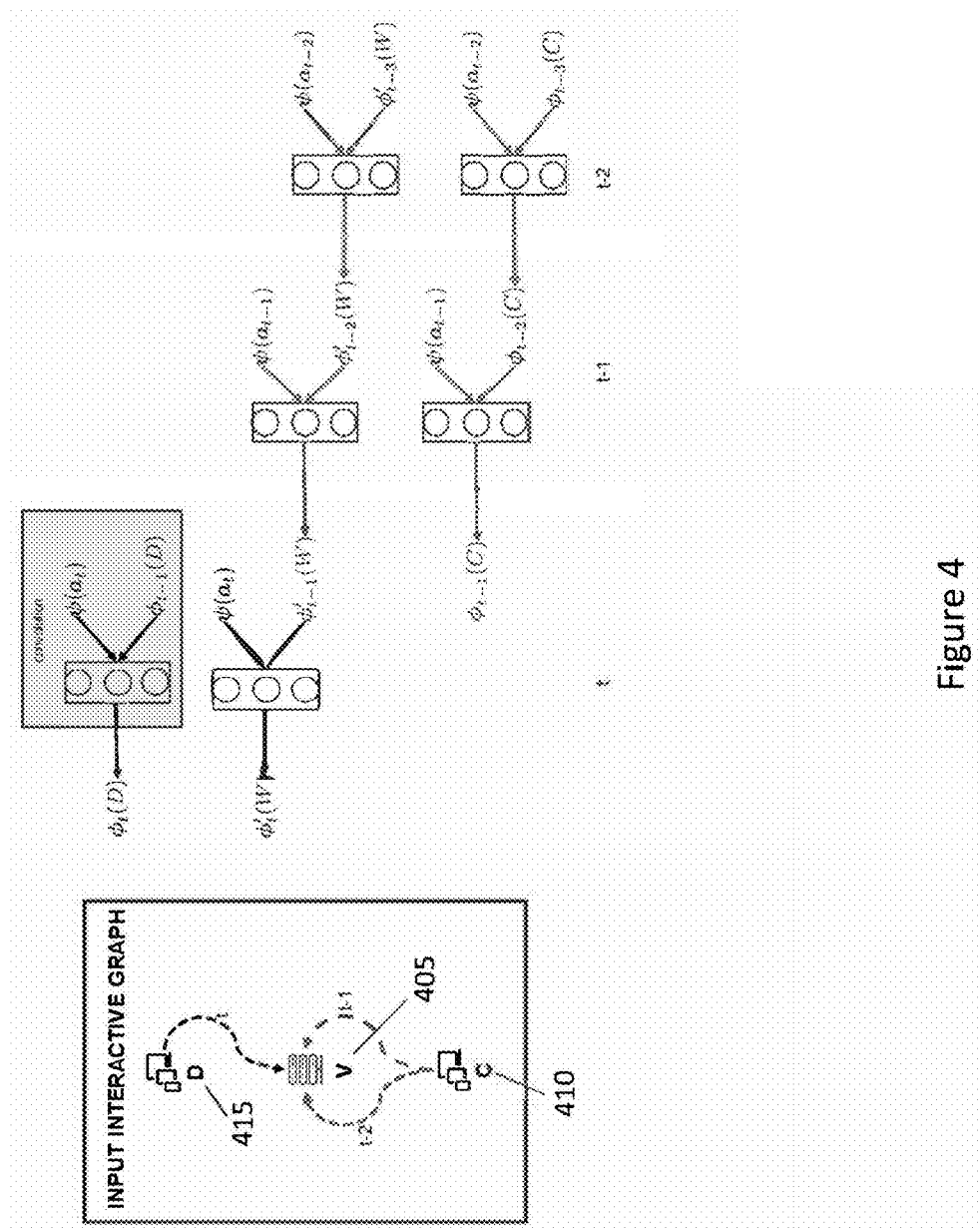
FIG. 4 provides a graphical representation of how the interaction history of each node may be preserved and propagated.

To better understand the embedding method, FIG. 4 provides a graphical representation of how the interaction history of each node may be preserved and propagated. Specifically, in the proposed example, host V 405 is shown as being subject to some malicious communication with client C 410 (represented by the edges (C, 2, W), (C, $a_{t-1}$, V)) before interacting with client D 415. According to Eq. 3, $\varphi'_t(V)$ is a linear combination between the current interaction's attribute, represented by $a_t$, and the previous behavior of V, represented by $\varphi'_{t-1}(V)$. However, by its recursive definition, $\varphi'_{t-1}(V)$ preserves information of the malicious interaction (C, $a_{t-1}$, V). Unrolling this process through time demonstrates how the embedding (V) can be interpreted as a behavioral memory of host V.

With respect to other problem settings, defining a learning formulation comprehensive of all the different source of information contained in $z_i$ is not trivial. On the on hand, given that an edge is represented by a triple, it is possible to leverage an energy-based framework to define the loss function as:

$$\mathcal{L}_1 = \Sigma_{e_n \in E'}[\varepsilon + \delta((\varphi_t(x_t), \psi(a_t), \varphi'_t(y_t)) - \delta(\varphi_t(x_n), \psi(a_n), \varphi'_t(y_n))]_+ \quad (5)$$

where E' is a set of artificially generated corrupted triples and $\delta(.)$ is a distance metric such as the L1 or L2-norm. However, generating corrupted triples in such settings is not as straightforward as generating corrupted triples for knowledge graph embeddings. For example, having no connection between two different nodes does not mean that such interaction would be anomalous a-priori. Moreover, Eq. 5 does not directly optimize $z_i$, but only geometrically relates $\varphi_t$, $\psi$ and $\varphi'_t$. While a max-margin loss may be used, such an approach is not easily extendable to learning edge representations.

Instead, anomaly detection can be interpreted as a one-class classification problem where it is possible to determine some conditions exemplar of good system behavior. Moreover, anomaly detection can be categorized as an unbalanced task, where standard behavior is considerably more prevalent than the abnormal behaviors. Thus, it is possible to utilize such disequilibrium to learn a single prototypical case representative of the normal behaviors. The following we are going to describe how a hypersphere clustering model is used to identify anomalies present in a dataset.

Hypersphere Clustering

Hyperspheres may be leveraged to partition the edge representation $z_i$ as normal (laying inside the sphere) or anomalous (laying outside the sphere). That is, we define a closed boundary around the training data as a hypersphere, shown in FIG. 5. By minimizing the volume of the hypersphere 505, we enforce all the training data to be more similar to the sphere's center c. In so doing, the normal connections 510 would naturally fall inside the sphere, while the rare anomalous cases 515 would be outside the sphere, since, by definition, the anomalous cases do not follow a normal patterns. Defining the distance from the center of the hypersphere to the embedded example as $d_i = \|z_i c\|_2$, where $\|.\|_2$ stands for the L2-norm and c represents the centroid of the hypersphere. The loss function can then be formulated as:

$$\mathcal{L}_2 = r^2 + \frac{1}{N}\Sigma_{i=1}^N d_i^2 \quad (6)$$

Adding an additional bias variable to enable a certain amount of outliers in the training set provides the following equation:

$$\mathcal{L}'_2 = r^2 + \frac{1}{N}\Sigma_{i=1}^N d_i^2 + \gamma \Sigma_{i=1}^N \xi_i \quad (7)$$

where $\xi = \max(d_i^2 - r^2, 0)$, and $\gamma$ is a tunable parameter. By doing so, Eq. 7 can be interpreted as a partial triplet loss with only an anchor (c) and a positive example ($z_i$).

While Eq. 7 has been demonstrated to be able to discount for a few outliers at the training phase, Eq. 7 is unstable due to the contrastive gradient yield by factor $d_i$ and $\xi_i$. In order to avoid such scenarios, an additional weighting scheme for parameter $d_i$ is proposed. Specifically, each example may be weighted based on its closeness with the centroid c, as shown in the equation below:

$$\mathcal{L}''_2 = r^2 + \Sigma_{i=1}^N w_i d_i^2 + \gamma \Sigma_{i=1}^N \quad (8)$$

Where $w_i$ is defined as:

$$w_i = \sigma\left(\left(\frac{r^2 - d_i^2}{d_i^2}\right) * \tau\right) + \varepsilon \quad (9)$$

where $\sigma(.)$ stands for the sigmoid function, $\tau$ is a temperature hyper-parameter to tune and $\varepsilon$ is a small constant value. Note that $w_i$ is interpreted as a weight factor, so its gradient is stopped during the learning process, i.e., $$\frac{\delta \mathcal{L}''_2}{\delta w}.$$

Finally, at inference time, the anomalies are detected based on the distance from the centroid c. That is, given a new example $z_j$, if:

$$d_j \geq r \qquad (10)$$

where $d_j = \|z_j - c\|_2$, and $z_j$ is labeled as an anomalous example. It is to be noted that a confidence interval is added to Eq. 10 in order to make the labelling process more robust:

$$d_j \geq (r + \mu) \qquad (11)$$

where $\mu$ is a parameter that can be hand-tune, and is defined as a percentage of the radius.

Figure 6:
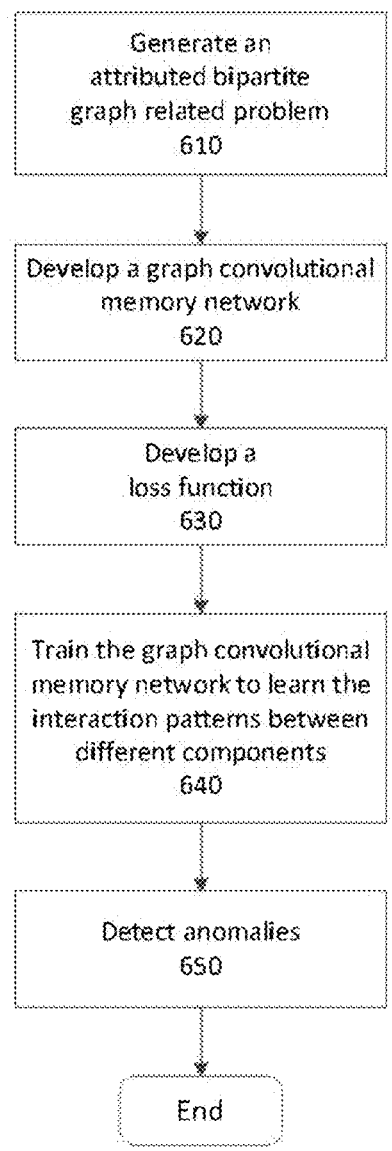
FIG. 6 illustrates an exemplary process 600 for detecting anomaly behavior in interactive networks.

FIG. 6 illustrates an exemplary process 600 for detecting anomaly behavior in interactive networks. In step 610, an attributed bipartite graph related problem is generated. That is, the anomaly detection problem is modeled as an attributed interactive bipartite graph. Once the problem has been generated, a graph convolutional memory network is developed in step 620. The development of the graph convolutional memory network enables the preservation of the interactions that happen among different nodes over time.

In step 630, a loss function is developed. The advancement of a robust loss function makes it suitable for unsupervised learning. Once the loss function has been developed, the graph convolutional memory network is trained to learn the interaction patterns between different components in step 650. From the trained convolutional memory network, anomalies may be detected in step 650.

Experiments

The Graph Convolution Memory Network (GCMN) defined above has been evaluated using two real-world datasets containing network traffic information with ground truth (i.e., explicitly labeled to indicate if the packet is normal or anomalous). Comparing the performances against models that combine deep learning with clustering methods, and against traditional models, provides an indication of the difficulty of the task. For the experiments described below, the baselines as well as the proposed model, were fine-tuned, and results of five different executions were averaged.

Evaluation Metrics

Anomaly detection is presented as a clustering problem since the different types of abnormalities are usually unknown at the time of training. In principle, for evaluation purposes, traditional clustering metrics such as the normalized mutual information or Rand index may be used. However, recent studies have suggested evaluating the anomaly detection as a one-class classification task problem where the positive class reflect the anomalous cases. Thus, for comparison purposes, the performances of all the models are evaluated via traditional classification metrics such as: accuracy, precision, recall and F1-score. Note that while the detection of uncommon behavior in traffic network is the main objective, the F1-score is computed only against the anomalous class.

Baselines

The GCMN model is compared with the following baselines:

DeepSphere proposes an autoencoder architecture based on the well-known Long-Short Term Memory (LSTM) neural network optimized using the hypersphere clustering process. The main difference between this and the proposed model is the embedding generative process. Instead of a traditional autoencoder architecture, a graph convolutional network that natively preserve the interactive structure of a graph is used in the proposed model.

Deep Autoencoding Gaussian Mixture Model (DAGMM) merges an autoencoder architecture with an estimation network to jointly learn a deep learning model with a traditional clustering algorithm such as the gaussian mixture model. While the proposed clustering architecture is easily integrable with the proposed graph embedding process, certain preliminary experiments have shown that such formulation is likely to degenerate to trivial solutions where all the datapoints belong to a single cluster. Thus, to avoid the computational complexity and the numerical instability, a simpler and more traditional approach is proposed.

K-means clustering is a method of vector quantization. A traditional K-means algorithm can thus fit the raw feature extracted from each dataset.

Datasets

To demonstrate the superior ability of the proposed GCMN model in detecting uncommon behavior inside a network traffic, two realistic datasets are applied. CTU-13, which is a dataset of botnet traffic that was captured in the CTU University, Czech Republic, in 2011, is a well-known dataset containing labeled traffic data. The dataset is divided into 13 different scenarios where different malware is executed inside a university network. The traffic is captured following the NetFlows standard, and each communication is tagged as normal, background or botnet (anomaly). For evaluation purposes, all the reported experiments discharge the connections labeled as background. Moreover, a single dataset combining the remaining examples of each scenario is generated. A summary of the dataset used is shown int Table 1 below.

TABLE 1

Dataset used for evaluation.

| | CTU-13 | CIDDS |
|---|---|---|
| Total Dimension | 799,777 | 10,000,000 |
| Number of Anomalies | 444,699 | 1,440,623 |
| Distinct IP Addresses | 52,730 | 17,792 |
| Distinct Port Used | 62,712 | 33,704 |

The testing dataset is then split into validation and test sets. Coburg Intrusion Detection Data Sets (CIDDS) is a carefully generated dataset to evaluate an intrusion detection system. CIDDS was generated to mimic a small business network inside an OpenStack environment. Note that to evaluate the performances of the different models better, the suspicious and unknown flows present in the external server dataset are eliminated. Finally, only the first ten million connections are kept to train and test the model.

Training Process & Parameters Tuning

Figure 7:
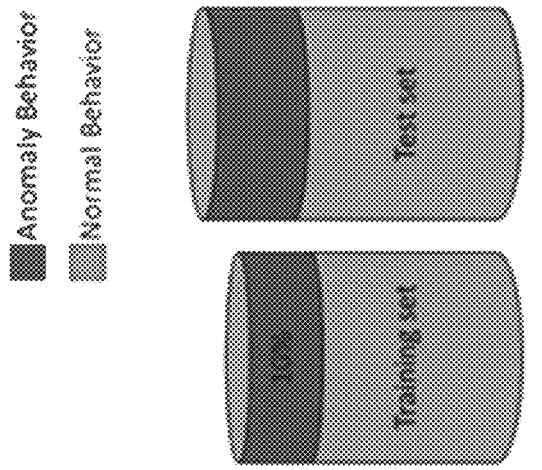
FIG. 7 provides a depiction of three different settings on which the model is trained and tested.
Figure 7:
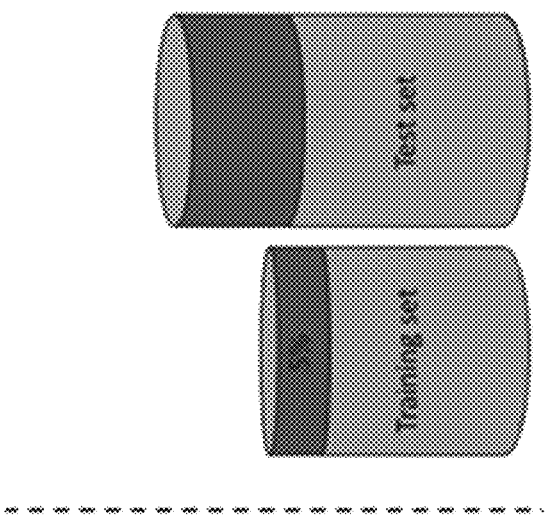
Figure 7:
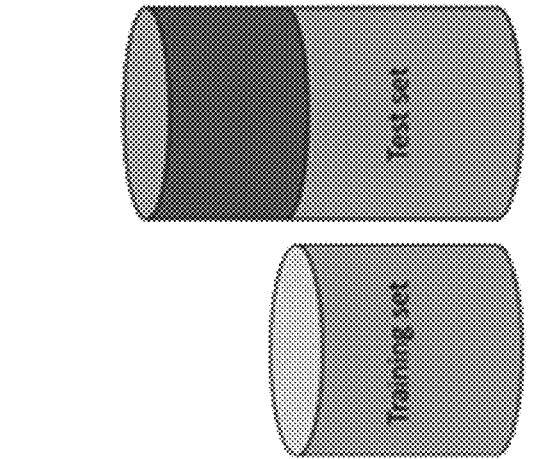

As indicated above, the primary goal of the proposed model is to detect anomalous connections. That is, the proposed GCMN model is expected to learn, at training time, an embedding prototypical of all the regular transmissions (denoted as c in the description on hyperspheres clustering). If a new connection deviates from the learned prototypical representation by more than a threshold value $(r+\mu)$, the connection is flagged as suspicious. As such, it is important to train the model on what is considered to be normal behavior. Otherwise, the learned archetypal embedding would be affected by noise. However, in a real-world environment, it is difficult to obtain a training set with only normal behavior. Thus, to evaluate such scenarios, the model is trained and tested in three different settings, as shown in FIG. 7. The first setting 705 includes a training set that is composed of only normal examples. In the second setting 710, the training set contains 5% anomalous and 95% normal examples. And in the third setting 715, the training set includes 10% anomalous examples and 90% normal examples.

Parameter Tuning

The experiments described below are obtained using the following parameter tuning. In order to evaluate the k-means model in terms of accuracy and F1-Score, the model is trained using only two clusters: one that is expected to represent normal behavior, and one to represent anomalous cases.

As indicated above, a traditional approach such as the k-means is not able to learn any valuable pattern from the raw features. This validates the idea that a deep learning approach can automatically learn a meaningful embedding of the problem without leveraging carefully design input features. Also, the results on the datasets that do not contain any anomalies are inferior. Such behavior is expected because without any anomalies at the training phase, the k-means algorithm is not able to learn any valuable differentiation patterns.

On the other hand, the DAGMM model appears to be subject to noise present in the different datasets, since it

TABLE 2

Anomaly detection performance results.

| | CTU-0% | | | | CTU-5% | | | | CTU-10% | | | |
|---|---|---|---|---|---|---|---|---|---|---|---|---|
| | Accuracy | Precision | Recall | F1-Score | Accuracy | Precision | Recall | F1-Score | Accuracy | Precision | Recall | F1-Score |
| DeepSphere | 84.99 | 89.93 | 86.68 | 93.61 | 84.78 | 89.07 | 89.75 | 89.38 | 84.23 | 91.03 | 86.62 | 88.58 |
| DAGMM | 91.17 | 94.37 | 93.18 | 93.75 | 80.24 | 90.4 | 80.91 | 85.28 | 84.73 | 88.73 | 93.22 | 84.72 |
| K-means | 59.35 | 0 | 0 | 0 | 60.42 | 15.44 | 48.7 | 22.86 | 50.01 | 19.73 | 48.74 | 28.09 |
| GCMN | 99.01 | 99.47 | 99.17 | 99.35 | 90.45 | 95.32 | 91.28 | 93.22 | 86.3 | 90.02 | 91.17 | 90.52 |

| | CIDDS-0% | | | | CIDDS-5% | | | | CIDDS-10% | | | |
|---|---|---|---|---|---|---|---|---|---|---|---|---|
| | Accuracy | Precision | Recall | F1-Score | Accuracy | Precision | Recall | F1-Score | Accuracy | Precision | Recall | F1-Score |
| DeepSphere | 97.26 | 98.22 | 90.77 | 94.32 | 96.29 | 94.92 | 88.83 | 91.93 | 96.87 | 97.22 | 87.86 | 92.3 |
| DAGMM | 82.3 | 58.17 | 97.15 | 72.76 | 80.25 | 54.64 | 91.36 | 68.39 | 71.86 | 42.73 | 93.52 | 58.66 |
| K-means | 66.9 | 0 | 0 | 0 | 66.48 | 1.95 | 39.13 | 3.72 | 66.11 | 3.95 | 40.34 | 7.2 |
| GCMN | 98.08 | 96.96 | 95.52 | 96.2 | 96.58 | 98.36 | 86.82 | 92.22 | 96.79 | 98.04 | 86.72 | 92.02 |

Table 2 provides anomaly detection performance results based on the CTU and CIDDS datasets. The table above reports the results when training the models with a trained dataset containing 0%, 5% and 10% of anomalous examples.

While DAGMM appears to perform well with four mixture components on all the datasets, DAGMM is sensitive to the setting of the energy's threshold used to detect the anomalies. The thresholds are defined in terms of the percentile of elements of the combined training and validation sets labeled as anomalous. Following the same approach, setting a threshold of 50% of the total energy on the CTU-0% dataset, while setting a threshold of 40% of the total energy on the CTU-5% and CTU-10% produced the best results. Additionally, 80% was the best performer on all the CIDDS datasets.

The DeepSphere model also provides a few parameters for hand-tuning, namely $\gamma$ and $\mu$. We found that $\gamma=0.005$ works relatively well for CTU-0% and CIDDS-0%, while $\gamma=0.01$ is used for the remaining datasets. Moreover, a tolerance of $\mu=10\%$ on CTU-0% I used, but $\mu=30\%$ appeared to work better on the CIDDS-0% dataset. Finally, $\mu=7\%$ is used on all the remaining experiments.

The proposed GCMN model also presents the same parameter of the DeepSphere model. As for DeepSphere, we found that $\gamma=0.005$ works best on the clean datasets, while $\gamma=0.01$ works on all the remaining cases. But on CTU-10%, $\gamma=0.05$ was the best performer. Finally, $\mu=30\%$ was used on CIDDS-0% and $\mu=80\%$ on CTU-0%. On the remaining dataset, $\mu=7\%$ was used.

Results

All the results reported above are the averages of five independent executions. Due to space limitation, results of the T-test conducted on the F1-score are not provided, but the results validate a significant improvement over almost all the results.

suffers for a huge drop in the performance when the noise is added at training time. Such behavior, as discussed above, is the consequence of strong overfitting.

The DeepSphere algorithm shares a similar loss function to the proposed model. DeepSphere shows significantly lower performances on the CTU datasets as well as the CIDDS-0% and CIDDS-5%. This validates the idea of representing the problem under the graph embedding framework. DeepSphere is the best performer on the CIDDS-10% dataset. This indicates that its learning phase is less affected by the noise introduced in such experiments and we suppose it is due to its reconstruction factor present in the autoencoder loss. However, it also uses more parameters with respect to the GCMN model, thus it requires more time for training and testing.

Finally, the proposed GCMN was the best performing model on almost all of the experiments, and achieved a relative improvement ranging from 5.9% to 2%, but is comparable to the best performing method on the CIDDS10%. Such results indicate that using a graph embedding model to do anomaly detection better represent the problem settings and can provide fascinating insight on the studied problem.

Figure 8:
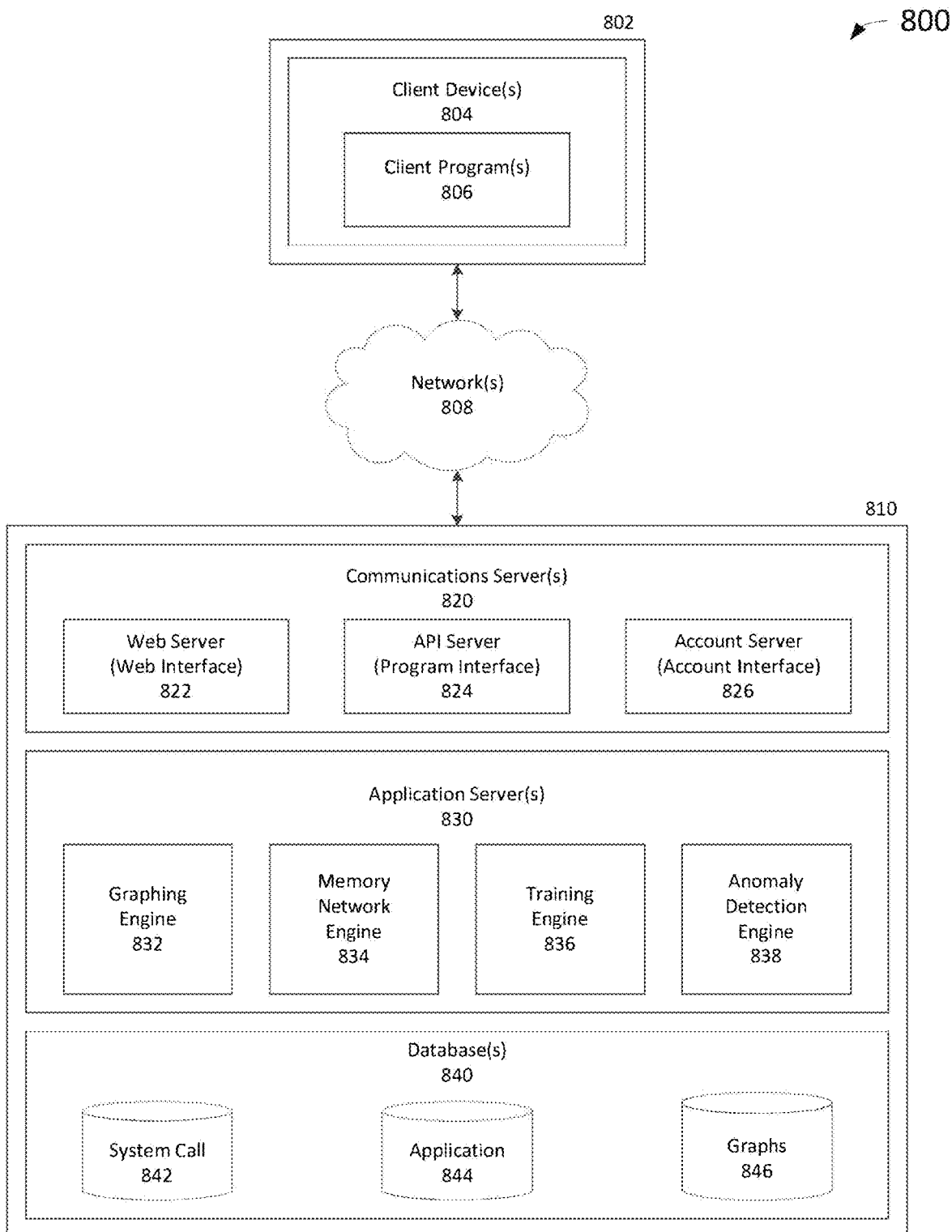
FIG. 8 is a block diagram of an exemplary computing system on which the implementation of anomaly behavior detection in interactive networks may be performed.

FIG. 8 is a block diagram of an exemplary computing system on which the detection of anomalous behavior in interactive networks may be performed. As shown, a computing system 800 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 8 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 800 may include, among various devices, servers, databases and other elements, one or more clients 802 comprising or employing one or more client devices 804, such as a laptop, a mobile computing device, a tablet, a personal computer, a wearable device, and/or any other computing device having computing and/or communications capabilities in accordance with the described embodiments. Client devices 804 may also include a cellular telephone, smart phone, electronic wearable device (e.g., smart watch, virtual reality headset), or other similar mobile devices that a user may carry on or about his or her person and access readily.

Client devices 804 generally may provide one or more client programs 806, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LB S) application (e.g., GPS, mapping, directions, positioning systems, geolocation, point-of-interest, locator) that may utilize hardware components such as an antenna, and so forth. One or more of client programs 806 may display various graphical user interfaces (GUIs) to present information to and/or receive information from one or more users of client devices 804. In some embodiments, client programs 806 may include one or more applications configured to conduct some or all of the functionalities and/or processes discussed below.

As shown, client devices 804 may be communicatively coupled via one or more networks 808 to a network-based system 810. Network-based system 810 may be structured, arranged, and/or configured to allow client 802 to establish one or more communications sessions between network-based system 810 and various client devices 804 and/or client programs 806. Accordingly, a communications session between client devices 804 and network-based system 810 may involve the unidirectional and/or bidirectional exchange of information and may occur over one or more types of networks 808 depending on the mode of communication. While the embodiment of FIG. 8 illustrates a computing system 800 deployed in a client-server operating environment, it is to be understood that other suitable operating environments and/or architectures may be used in accordance with the described embodiments.

Data communications between client devices 804 and the network-based system 810 may be sent and received over one or more networks 808 such as the Internet, a WAN, a WWAN, a WLAN, a mobile telephone network, a landline telephone network, personal area network, as well as other suitable networks. For example, client devices 804 may communicate with network-based system 810 over the Internet or other suitable WAN by sending and or receiving information via interaction with a website, e-mail, IM session, and/or video messaging session. Any of a wide variety of suitable communication types between client devices 804 and system 810 may take place, as will be readily appreciated. In particular, wireless communications of any suitable form (e.g., Bluetooth, near-field communication, etc.) may take place between client device 804 and system 810, such as that which often occurs in the case of mobile phones or other personal and/or mobile devices.

Network-based system 810 may comprise one or more communications servers 820 to provide suitable interfaces that enable communication using various modes of communication and/or via one or more networks 808. Communications servers 820 may include a web server 822, an API server 824, and/or a messaging server 826 to provide interfaces to one or more application servers 830. Application servers 830 of network-based system 810 may be structured, arranged, and/or configured to provide various online services to client devices that communicate with network-based system 810. In various embodiments, client devices 804 may communicate with application servers 830 of network-based system 810 via one or more of a web interface provided by web server 822, a programmatic interface provided by API server 824, and/or a messaging interface provided by messaging server 826. It may be appreciated that web server 822, API server 824, and messaging server 826 may be structured, arranged, and/or configured to communicate with various types of client devices 804, and/or client programs 806 and may interoperate with each other in some implementations.

Web server 822 may be arranged to communicate with web clients and/or applications such as a web browser, web browser toolbar, desktop widget, mobile widget, web-based application, web-based interpreter, virtual machine, mobile applications, and so forth. API server 824 may be arranged to communicate with various client programs 806 comprising an implementation of API for network-based system 810. Messaging server 826 may be arranged to communicate with various messaging clients and/or applications such as e-mail, IM, SMS, MMS, telephone, VoIP, video messaging, IRC, and so forth, and messaging server 826 may provide a messaging interface to enable access by client 802 to the various services and functions provided by application servers 830.

Application servers 830 of network-based system 810 may be servers that provide various services such as tools for verifying URLs based on information collected about customers. Application servers 830 may include multiple servers and/or components. For example, application servers 830 may include a graphing engine 832, memory network engine 834, training engine 836, and/or anomaly detection engine 838. These servers and/or components, which may be in addition to other servers, may be structured and arranged to detect anomalous behavior in interactive networks.

Application servers 830, in turn, may be coupled to and capable of accessing one or more databases 840 including system call database 842, application database 844, and/or table database 846. Databases 840 generally may store and maintain various types of information for use by application servers 830 and may comprise or be implemented by various types of computer storage devices (e.g., servers, memory) and/or database structures (e.g., relational, object-oriented, hierarchical, dimensional, network) in accordance with the described embodiments.

Figure 9:
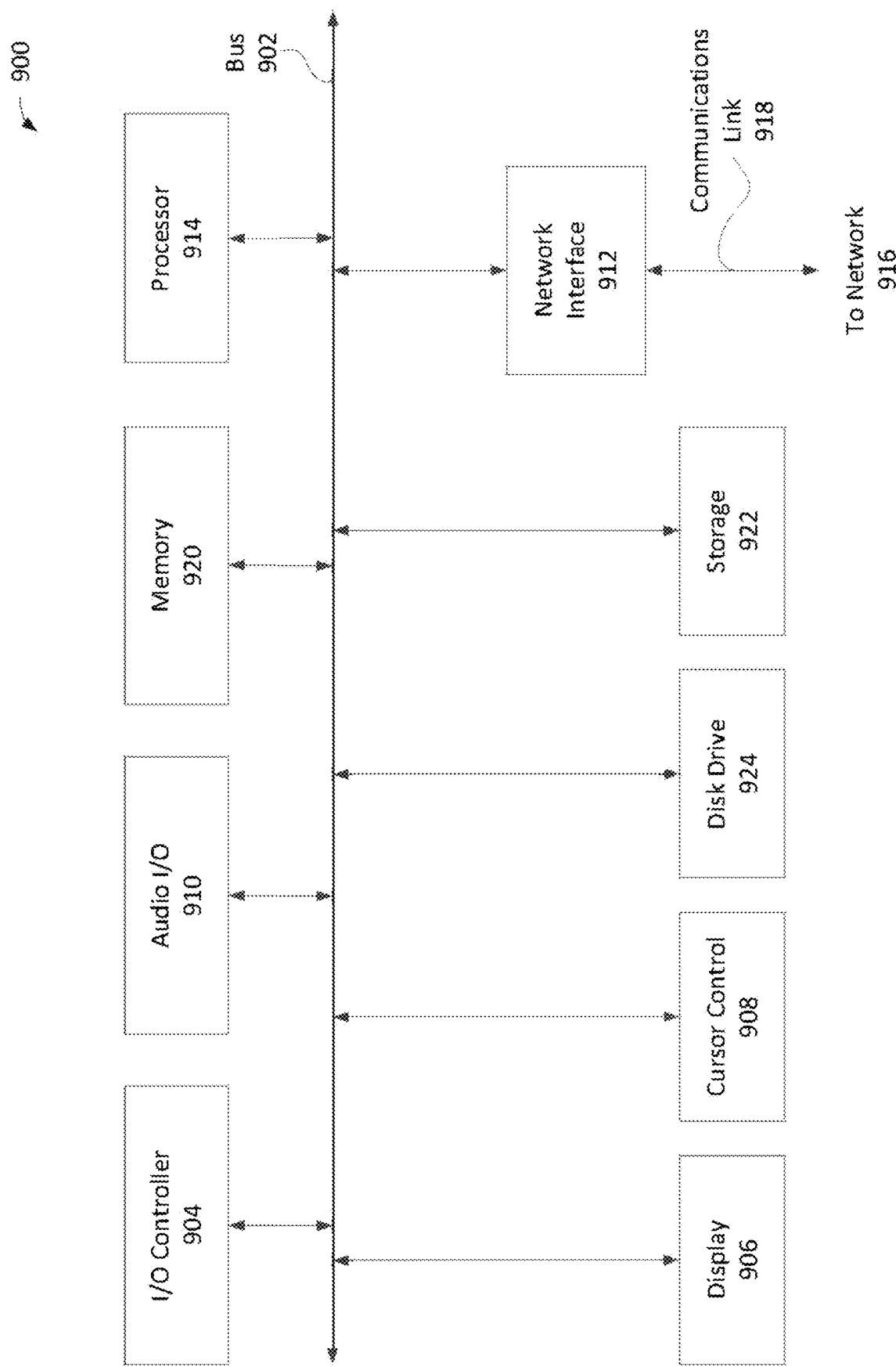
FIG. 9 is a block diagram of an exemplary computer system suitable for implementing one or more devices of the computing system in FIG. 8.

FIG. 9 illustrates an exemplary computer system 900 in block diagram format suitable for implementing on one or more devices of the computing system in FIG. 8. In various implementations, a device that includes computer system 900 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 900 in a manner as follows. Additionally, as more and more devices become communication capable, such as smart devices using wireless communication to report, track, message, relay information and so forth, these devices may be part of computer system 900.

Computer system 900 may include a bus 902 or other communication mechanisms for communicating information data, signals, and information between various components of computer system 900. Components include an input/output (I/O) controller 904 that processes a user action, such as selecting keys from a keypad/keyboard, selecting one or more buttons, links, actuatable elements, etc., and sends a corresponding signal to bus 902. I/O controller 904 may also include an output component, such as a display 906 and a cursor control 908 (such as a keyboard, keypad, mouse, touchscreen, etc.). In some examples, I/O controller 904 may include an image sensor for capturing images and/or video, such as a complementary metal-oxide semiconductor (CMOS) image sensor, and/or the like. An audio I/O component 910 may also be included to allow a user to use voice for inputting information by converting audio signals. Audio I/O component 910 may allow the user to hear audio.

A transceiver or network interface 912 transmits and receives signals between computer system 900 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 914, which may be a micro-controller, digital signal processor (DSP), or other processing component, processes these various signals, such as for display on computer system 900 or transmission to other devices over a network 916 via a communication link 918. Again, communication link 918 may be a wireless communication in some embodiments. Processor 914 may also control transmission of information, such as cookies, IP addresses, images, and/or the like to other devices.

Components of computer system 900 also include a system memory 920 (e.g., RAM), a static storage component 922 (e.g., ROM), and/or a disk drive 924. Computer system 900 performs specific operations by processor 914 and other components by executing one or more sequences of instructions contained in system memory 920. Logic may be encoded in a computer-readable medium, which may refer to any medium that participates in providing instructions to processor 914 for execution. Such a medium may take many forms, including but not limited to, non-volatile media, volatile media, and/or transmission media. In various implementations, non-volatile media includes optical or magnetic disks, volatile media includes dynamic memory such as system memory 920, and transmission media includes coaxial cables, copper wire, and fiber optics, including wires that comprise bus 902. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 802, network-based system 810, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for detecting anomaly behavior in interactive networks comprising:
    a non-transitory memory storing instructions; and
    one or more hardware processors coupled to the non-transitory memory and configured to read the instructions from the non-transitory memory to cause the system to perform operations comprising:
        generating an attributed bipartite graph related problem for a bipartite graph, wherein the bipartite graph provides an encoding representative of connections between users and bastions;
        developing a graph convolutional memory network based on the generated problem;
        developing a loss function based on the developed graph convolutional memory network;
        training the developed graph convolutional memory network to learn interaction patterns between different components, wherein the training of the developed graph convolutional memory network is performed in an unsupervised setting; and
        detecting anomalies based on the trained developed graph convolutional memory network.

2. The system of claim 1, wherein the attributed bipartite graph related problem is an anomaly detection problem.

3. The system of claim 1, wherein the graph convolutional memory network enables a preservation of the interactions occurring at different nodes over time.

4. The system of claim 3, wherein the graph convolutional memory network includes a tunable parameter.

5. The system of claim 1, wherein the detected anomalies relate to unauthorized secure shell (SSH) connections.

6. A method for detecting anomaly behavior in interactive networks comprising:
    generating an attributed bipartite graph related problem for a bipartite graph, wherein the bipartite graph provides an encoding representative of connections between users and bastions;
    developing a graph convolutional memory network based on the generated problem;
    developing a loss function based on the developed graph convolutional memory network;
    training the developed graph convolutional memory network to learn interaction patterns between different components, wherein the training of the developed graph convolutional memory network is performed in an unsupervised setting; and
    detecting anomalies based on the trained developed graph convolutional memory network.

7. The method of claim 6, wherein the attributed bipartite graph related problem is an anomaly detection problem.

8. The method of claim 6, wherein the training of the graph convolutional memory network is performed in an unsupervised setting.

9. The method of claim 6, wherein the graph convolutional memory network enables a preservation of the interactions occurring at different nodes over time.

10. The method of claim 9, wherein the graph convolutional memory network includes a tunable parameter.

11. The method of claim 6, wherein the detected anomalies relate to unauthorized SSH connections.

12. A non-transitory machine-readable medium having stored thereon machine-readable instructions executable to cause performance of operations comprising:

generating an attributed bipartite graph related problem for a bipartite graph, wherein the bipartite graph provides an encoding representative of connections between users and bastions;

developing a graph convolutional memory network based on the generated problem;

developing a loss function based on the developed graph convolutional memory network;

training the developed graph convolutional memory network to learn interaction patterns between different components, wherein the training of the developed graph convolutional memory network is performed in an unsupervised setting; and detecting anomalies based on the trained developed graph convolutional memory network.

13. The non-transitory machine-readable medium of claim 12, wherein the attributed bipartite graph related problem is an anomaly detection problem.

14. The non-transitory machine-readable medium of claim 12, wherein the training of the developed graph convolutional memory network is performed in an unsupervised setting.

15. The non-transitory machine-readable medium of claim 12, wherein the graph convolutional memory network enables a preservation of the interactions occurring at different nodes over time.

16. The non-transitory machine-readable medium of claim 15, wherein the graph convolutional memory network includes a tunable parameter.

* * * * *